Aug. 11, 1931.  C. C. CALKINS  1,818,532
ROTARY ROD WEEDER
Filed Feb. 10, 1930   2 Sheets-Sheet 1

Claude C. Calkins
Inventor

By Herbert E. Smith
Attorney

Aug. 11, 1931.  C. C. CALKINS  1,818,532
ROTARY ROD WEEDER
Filed Feb. 10, 1930  2 Sheets-Sheet 2

CLAUDE C. CALKINS
Inventor

By Herbert E. Smith
Attorney

Patented Aug. 11, 1931

1,818,532

UNITED STATES PATENT OFFICE

CLAUDE C. CALKINS, OF SPOKANE, WASHINGTON

ROTARY ROD WEEDER

Application filed February 10, 1930. Serial No. 427,117.

My present invention relates to improvements in rotary rod weeders or wheeled implements which include a rotary rod traveling beneath the surface of the soil, for removing weeds and other vegetation, including their roots, from the soil. The improved implement may be horse drawn, or may be propelled by the use of a tractor coupled to the implement, and the rotary rod, square, round, or angular in cross section is rotated or revolved by power developed from the movement of one of the implement wheels used as a driving wheel for the operation of the rotary rod.

The primary object of the invention is to provide a strong but light implement, possessing durability, and constructed with its parts arranged and combined in such manner that the frame, which is pivoted or hinged on the axle for a pair of wheels; the weeder frame; and the driving gear frame, are all joined and well braced, to co-operate in attaining an implement that may be manufactured with facility at a comparatively low cost of production, and which is most efficient in the performance of its required functions.

The invention consists in certain novel combinations and arrangements of parts as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1:
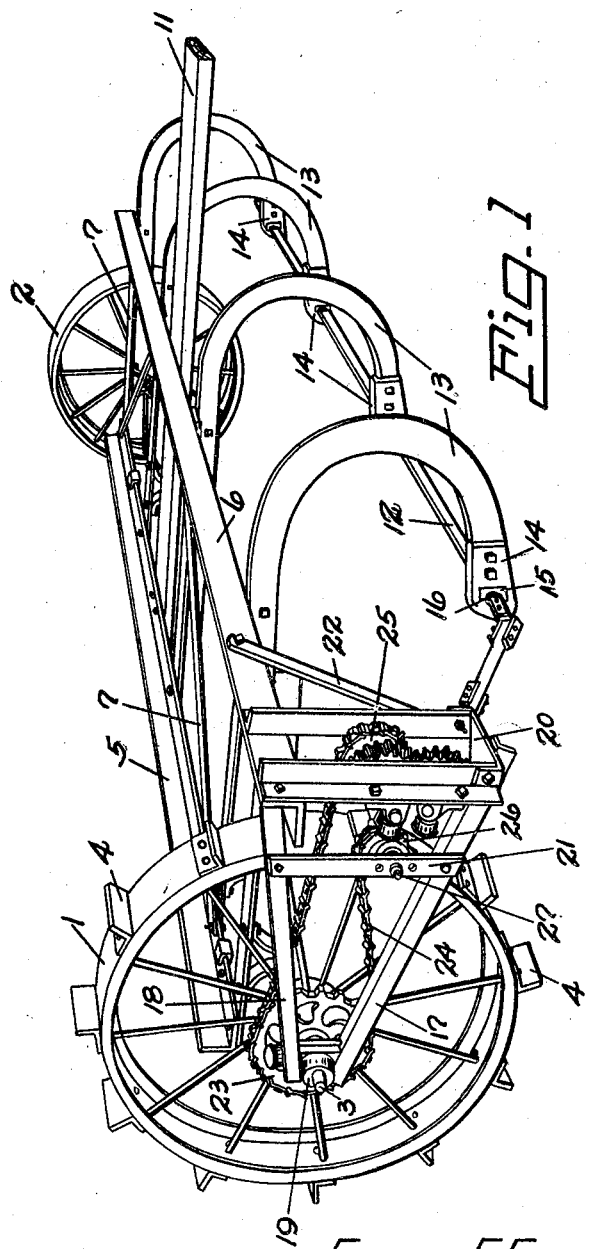
Figure 1 is a perspective view of the implement involving my invention, with the depressing-tongue or lever shown broken away for convenience of illustration.

In carrying out my invention I utilize a pair of spaced wheels 1 and 2 for supporting the implement, the wheels being journaled on the main axle 3, and the wheel 1 being equipped with diagonal cleats 4 to insure the necessary traction for supplying the power to turn the rotary weeder rod 12.

The main frame of the implement includes a pair of transversely extending bars 5 and 6 of angle iron construction, and these parallel cross bars are joined and braced by the use of bolted or riveted longitudinally disposed and diagonally disposed braces or brace bars 7. The main frame is provided with a suitable number of bearings 8, rigidly fixed at the underside thereof, and these bearings have journals 9 on the axle, with spacing collars 10 for the journals, to prevent lateral displacement. A central, longitudinally extending tongue or lever 11 is rigidly fixed to the main frame and by means of this lever the frame may be turned on the axle as a pivot to depress the weeder rod into the soil and beneath the surface of the soil. As the rod advances broadside and revolves beneath the surface of the soil, the weeds and other vegetation are uprooted and tumbled to the rear, free of the weeder rod.

The rod may be angular, round, or square in cross section, and is journaled and supported in a weeder frame that includes spaced bearing yokes 13 that extend longitudinally of the implement and are rigidly bolted or riveted to the main frame. Each of the yokes is provided with a head or shoe 14, and these heads have removable bearing blocks 15 fitted therein, in which blocks, spaced bearing bushings 16 on the rod are journaled, to provide for the rotary movement of the rod. The blocks and bushings may be removed when necessary to permit replacements to compensate for wear on the parts.

In Figure 1 the near end of the rod is shown as terminating adjacent the inner side of the traction wheel 1, while the far end of the rod terminates beyond the outer side of the wheel 2, this end of the rod projecting beyond the outer shoe a distance equal to approximately one third the space between adjoining shoes. By this arrangement, the rod is counterbalanced in its bearings, and the torque strains developed as the rod is revolved are equalized and distributed uniformly throughout the length of the rod.

Figure 2:
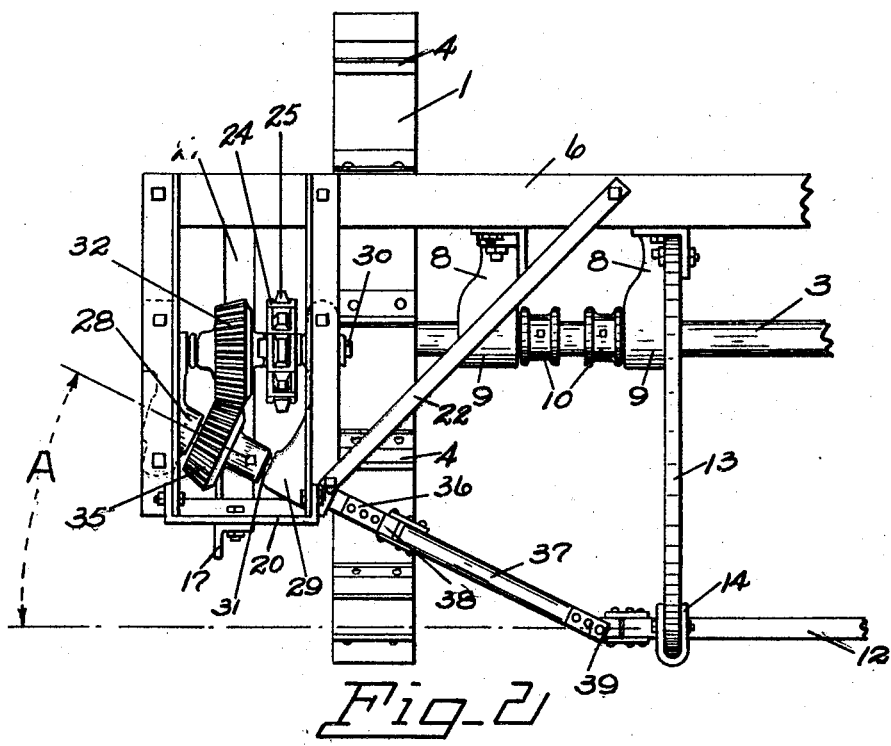
Figure 2 is a view in elevation showing the traction-driving wheel, transmission gearing of the driving mechanism, the rotary rod and flexible shaft, and other parts of the implement.
Figures 3, 4:
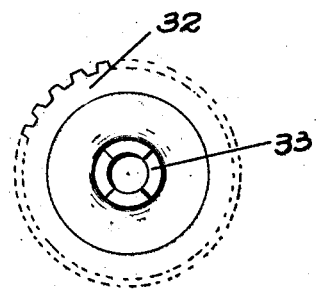
Figure 3 and Figure 4 are, respectively, views of the driven sprocket and of a transmission gear, which are provided with complementary members to form a clutch between them.
Figure 5:
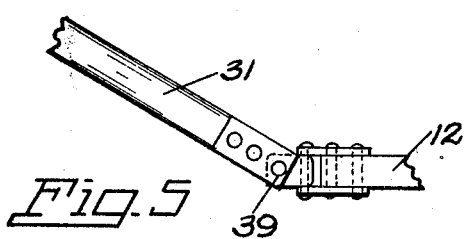
Figure 5 is an enlarged detail view showing one of the universal joints between the rotary rod and a section of the flexible driving shaft, or power transmitting shaft.

As seen in Figures 1 and 2 the frame bar 6, of angle iron, projects laterally of the traction wheel 1, and a gear frame is supported between the cross bar and the axle 3. The gear frame comprises a pair of struts 17 and 18 bolted to a bearing block 19 journaled on the axle, and these struts diverge vertically and are bolted to a rectangular, upright yoke 20 located beyond the periphery of the wheel. A vertical brace 21 connects the diverging struts, and a diagonally extending brace 22 joins the lower inner corner of the rectangular yoke with the cross bar 6 of the main frame.

The laterally arranged gear frame is thus rigidly secured to the main frame, and with the main frame, is pivoted to turn on the axle as a center.

A chain drive is provided for the weeder rod that includes a driving sprocket 23 on the axle 3, a chain 24 passing over the drive sprocket and also over a driven sprocket 25, an idler sprocket 26 being mounted on the shaft 27 to guide the chain and take up slack therein. The shaft 27 is supported in the brace plate 21 and other suitable part of the gear frame, and in the gear frame are rigidly supported spaced bearing brackets or castings 28 and 29 in which brackets are mounted two stud shafts 30 and 31. The driven sprocket wheel 25 is mounted on the shaft 30 and adjacent the sprocket wheel a bevel wheel 32 is journaled, and the sprocket and gear wheel are provided, respectively with clutch members 34 and 33 on their adjoining hubs whereby the gear wheel is made to revolve with the sprocket wheel.

A complementary bevel gear 35 on the stud shaft 31 meshes with the gear wheel 32, and this shaft has an alined section 36 that is joined to the shaft section 37 by a universal joint 38, another universal joint 39 being used to join section 37 with the weeder rod.

In Figure 2 the arc or dotted line A indicates the minimum degree of angularity that is attained between the flexible transmission shaft and the weeder rod, and it will be apparent that this minimum degree of angularity insures the most efficient transmission of power from the driving mechanism to the rotary weeder rod.

As thus described and illustrated the implement of my invention may be manufactured with facility and at low cost, the construction and operation are simplified, and a durable and efficient implement is assured.

Having thus fully described my invention, what I claim as new and desire to secure by Letters Patent is:—

1. The combination with an axle and wheels journaled thereon, of a main frame including a cross bar projecting laterally of one of the wheels, an upright yoke located outside said wheel rigid with said bar and depending therefrom, a bearing block on the axle outside the wheel, and a pair of diverging struts fixed to the block with their diverged ends rigid with the cross bar and yoke.

2. The combination with an axle, spaced wheels thereon, and a main frame pivoted on the axle, one of said wheels operating as a drive wheel and said frame having a frame bar extending beyond the outer side of said wheel, of a rigid bearing yoke depending from the extending frame bar, a bearing block on the axle, struts fixed to said block, diverging therefrom, and fixed to the yoke, spaced down-turned bearing yokes rigid with the main frame and bearing heads in said yokes, a rotary rod journaled in said heads with one end terminating on the inner side of the drive wheel and its other end projecting beyond the outer side of the other wheel, driving mechanism operated by the drive wheel, transmission mechanism carried in the upright yoke and struts and operated by the driving mechanism, and a flexible transmission shaft between the transmission mechanism and the rotary rod.

3. In a rotary rod weeder, the combination with its axle and spaced wheels one of which is a traction wheel, a main frame journaled on and located above the axle and including a rear cross bar extending laterally beyond the traction wheel, of a rigid U-shaped bearing-yoke depending from the extended end of the said bar, a bearing block journaled on the axle exterior of the traction wheel, a pair of diverging struts fastened to said bearing block, the rear end of the upper strut fastened to said extended bar and the rear end of the lower strut fastened to said yoke, and a diagonal brace rigidly joining the rear cross bar and the lower end of the yoke.

In testimony whereof I affix my signature.

CLAUDE C. CALKINS.